Feb. 23, 1932.   W. A. KULL ET AL   1,846,263
STEERING GEAR
Filed Dec. 31, 1928   2 Sheets-Sheet 2
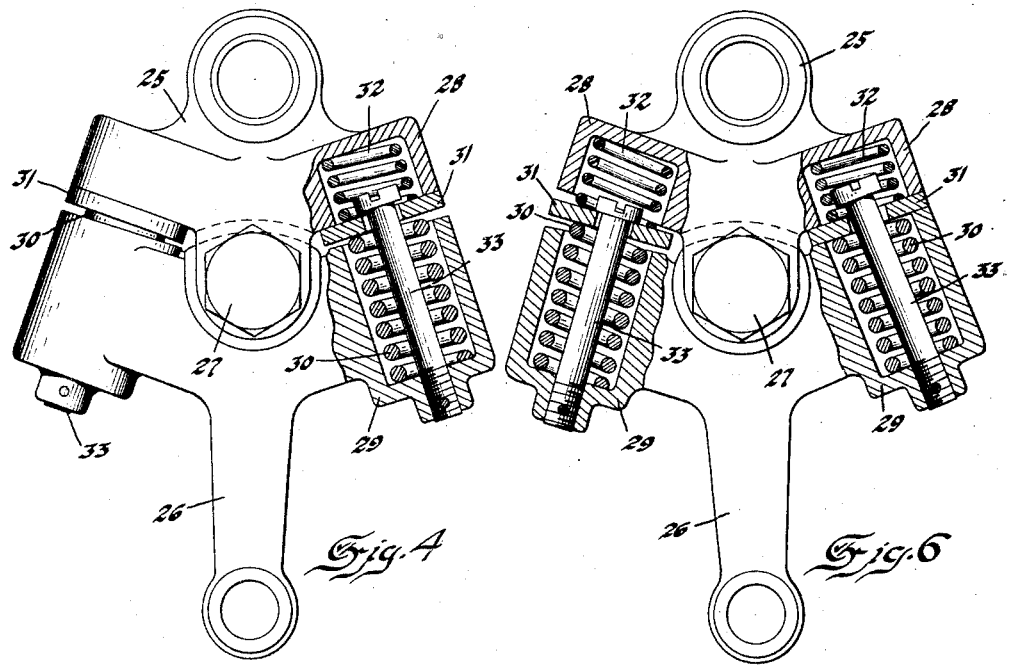
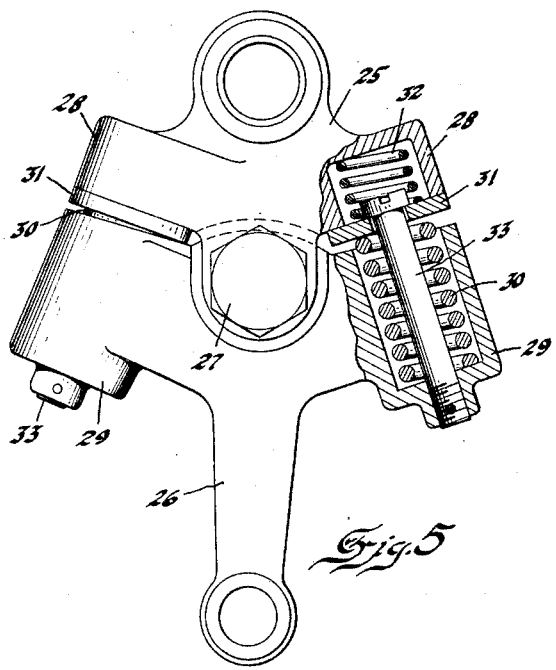
Inventors
Walter A. Kull &
Harry M. Denyes
By Blackmore, Spencer & Hush
Attorneys Patented Feb. 23, 1932

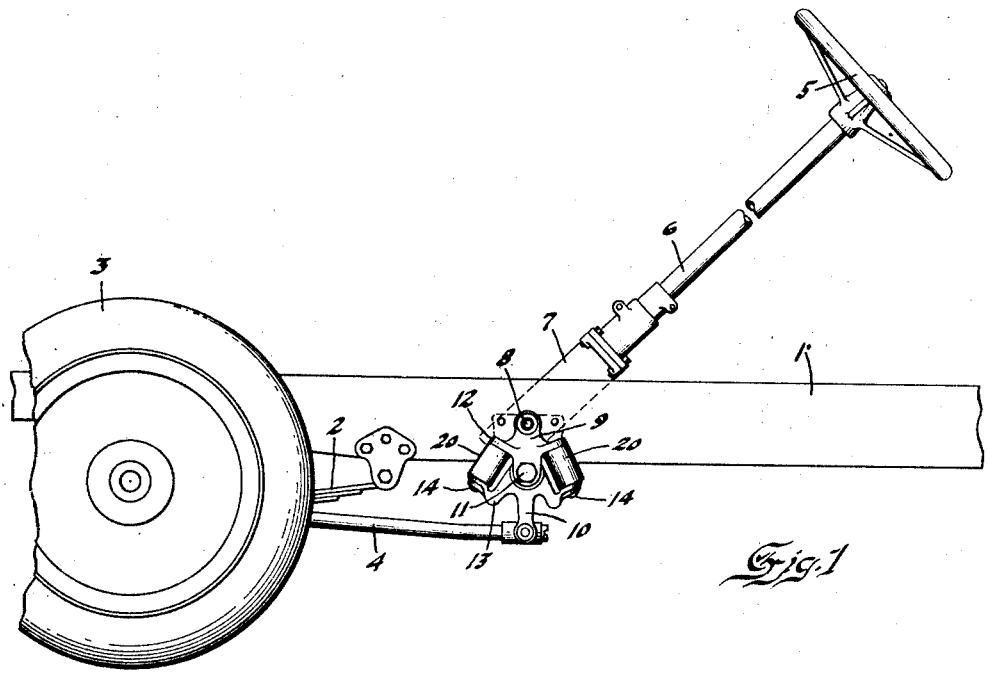
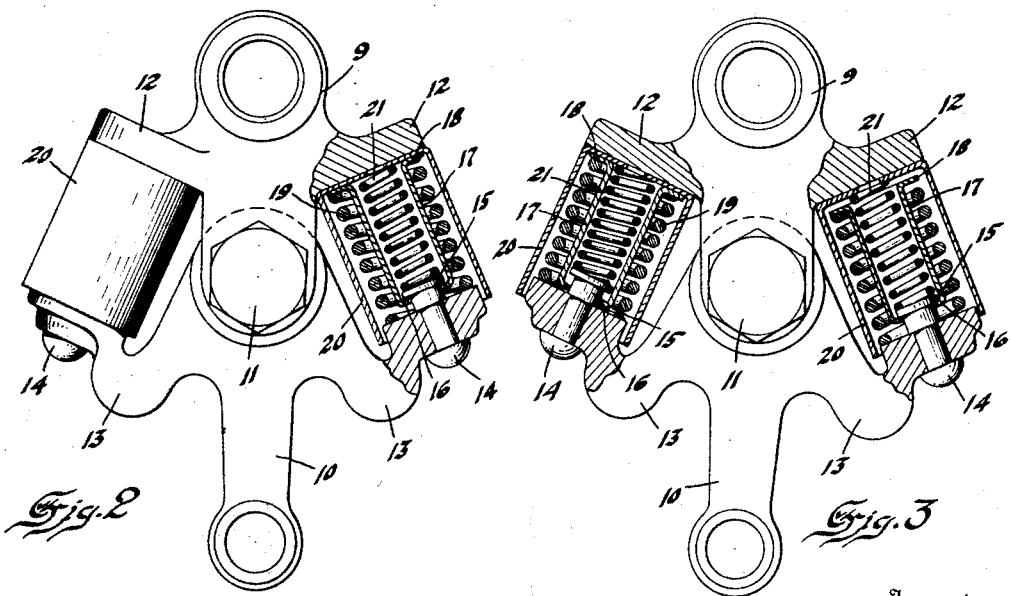

1,846,263

UNITED STATES PATENT OFFICE

WALTER A. KULL AND HARRY M. DENYES, OF SAGINAW, MICHIGAN, ASSIGNORS TO GENERAL MOTORS CORPORATION, OF DETROIT, MICHIGAN, A CORPORATION OF DELAWARE

STEERING GEAR

Application filed December 31, 1928. Serial No. 329,398.

This invention relates to steering mechanism for motor vehicles and more particularly to an improvement in shock absorbing devices, and is an amplification of the invention described in our pending application for patent, S. N. 255,437.

It is an object of the present invention to provide an improved device to dampen or cushion front wheel wobble or shimmy, road shocks, and the various reactions incident to the guiding of a vehicle on the roadway and thus eliminate the bad effects of shock and strain, such as the wear and breakage of running gear and chassis parts, reduce the hazards of driving and avoid the imposition of highly disagreeable sensations on the human nervous system.

A further object of the present invention is to provide a pitman arm, comprising two sections pivoted to each other end having interposed between cooperating portions thereof, on each side of the pivotal axis, a cushioning spring which is compressed upon relative movement of the sections in one direction beyond an intermediate neutral position, but whose extent of expansion is so limited that the expansion force is not active on these sections during the relative movement in the opposite direction beyond said intermediate position.

The invention will best be understood upon reference to the accompanying drawings, wherein Fig. 1 is a fragmentary side elevation of the front portion of a motor vehicle illustrating the application of the present invention. Fig. 2 is an elevation with parts broken away, showing the pitman arm sections in the intermediate neutral or mean position of their range of relative movement. Fig. 3 is an elevation, partly in section, illustrating the parts in an off-center position. Figs. 4, 5, and 6, are elevations partly in section, illustrating a modified form of pitman arm, with the parts in various relative positions.

With the type of pitman arms shown in the pending application before mentioned, it was sometimes found that during certain conditions of use as, for instance, when the vehicle was travelling in a straight path on smooth pavement, the front wheels were not always held absolutely steady. This is attributed to the fact that the opposing springs balance one another throughout a small range of movement in either direction beyond the mean or dead-center position. In other words, neither spring exerts any appreciable pressure in excess of the other, and for this reason a comparatively large movement of the jointed parts is necessary before there is any considerable differential in value of the tension in opposing springs. In the present instance, it is proposed to provide a structure wherein the springs balance each other only at the intermediate dead-center position, and so soon as relative movement of the joined parts occurs, the one spring will be compressed to yieldingly resist the movement while the expansive force of the opposing spring will immediately be checked or rendered ineffective, whereby the tension of one spring does not offset that of the other, and the full tension value of the spring undergoing compression is available to cushion the movement.

The structure to accomplish this result will be clearly apparent from the accompanying drawings wherein the chassis frame 1 is shown as being flexibly supported through leaf springs 2, upon an axle on which the road wheels are mounted. The front wheel 3 may be swung about a vertical axis to guide the vehicle by the conventional linkage of which the drag bar 4 is a part. The operator steers the vehicle through a hand wheel 5 on the post or column 6 having at its lower end, suitable gear mechanism contained within a housing or casing 7, and from which projects laterally an oscillatory shaft 8. Fixedly mounted on the shaft 8 for swinging movement therewith to transmit the rotation of the steering wheel 5, to the drag bar 4 is a pitman arm, which according to this invention may consist of two sections 9 and 10, joined or pivotally connected to each other by hinge pin or stud 11, and having laterally disposed, oppositely projecting ears or lugs 12 and 13 respectively. Interposed between each pair of ears 12 and 13 and on opposite sides of the pivot pin 11 is a shock absorbing or cushioning device which yieldingly resists relative movement of the sections 9 and 10, and which cushioning device will now be described.

The ear 13 is shown as being provided with a stud or rivet 14, having a head 15 and between which head and the face of the ear 13 is interposed for relative sliding movement the inturned flange 16 of a sleeve 17 that has at its opposite end an out-turned annular flange 18. The flange 18 forms a seat for one end of an elastic element, such as a comparatively heavy coil spring 19, that is interposed between the flange and the upper surface of the ear 13. When the parts are in the normal or neutral position, as illustrated in Fig. 2, a slight space or clearance exists between flange 16 and head 15. In this relation of parts, each spring is held under a slight compression between the ear 12 and ear 13, and the tensions of the two opposing springs balance each other, and tend to maintain the parts in the neutral position. This clearance space between the head 15 and flange 16, however, is quite small, and so soon as a forced movement occurs, the space is taken up at once in that unit between the set of ears that are moving apart and the further relative movement or spreading apart of the ears 12 and 13, causes the sleeve 17 to be pulled along with the ear 13, moving the flange 18 away from the ear 12 and restricting or holding the spring against continued expansion. At the same time the spring of the other unit is undergoing compression, and its full tension value is available to resist the movement of the other set of ears 12 and 13 toward each other, because its resistance is not off-set or balanced by the other spring. This action is clearly indicated in Fig. 3. Thus, it may be stated, that regardless of the direction of movement the full force of one of the springs is ever available to yieldingly resist the movement and so cushion shocks and sharp reactions and at the same time prevent and eliminate unsteadiness or shimmy in the wheels.

To conceal the spring and improve the appearance of the device, and also to preclude the accumulation thereon of dirt and water, a cup-shaped housing or casing 20 may be provided, whose base portion rests against the ear 12, and into whose open end the ear 13 telescopes. A relatively light spring or other elastic element 21, may be inserted within the sleeve 17 and between the rivet head 15 and base of the casing 20 in order to prevent rattle and give the desired degree of resilience to off-set slight shocks or any shimmy that might tend to occur in the lever sections. This light spring 21 is sufficient to exert the required reaction to the back slap or violent return of the sections 9 and 10 to their normal intermediate position, and yet is not strong enough as compared with the spring 19, to result in excessive freedom of relative movement in the jointed sections when they are in aligned position during ordinary straight ahead travel.

As an alternative form of the invention, Figs. 4, 5, and 6, show a jointed pitman arm comprising an upper section 25 and a lower section 26 connected by a pivot pin or stud 27, and having oppositely disposed recessed projections 28 and 29, respectively. In the normal position of parts as illustrated in Fig. 4, a comparatively heavy coil spring 30, is positioned in the recess of the arm 29, and seats at its lower end against the end wall of the recess and its upper end against a washer or plate 31, abutting the under-side of the lug or projection 28. A lighter spring 32 is interposed between the upper side of the washer 31, and the base of the recess in the projection or ear 28. A stud or bolt 33 extends downwardly through an enlarged opening in the disc 31 and through the center of the spring 30 into screw threaded engagement at its lower end with the ear 29. A small clearance space is provided between the head of the bolt 33 and the washer 31, so that in the intermediate or mean position of the sections the opposing springs balance each other, but so soon as any slight relative movement occurs, the clearance is taken up and the balance is destroyed, as will be evident from the illustration of the parts as shown in Figs. 5 and 6. In Fig. 5, the part 26 is illustrated as being swung about its pivot 27, slightly toward the left, and the head of the bolt 33 is in contact with the washer. Further movement of the part 26 toward the left would cause the washer 31 to be moved along with it so as to hold the spring 30 from exerting its expansive force to counteract the effect of the resistance offered to the movement by the tension of the corresponding spring on the opposite side of the pivot 27.

Fig. 6 illustrates an extreme position of the parts with the lower section 26 swung toward the right. The compression of the one spring and the restriction of expansion of the other will be clearly apparent from this figure. It will be evident, of course, that when the parts are moved to the opposite limit of movement, the relation of the parts will be reversed. The lighter springs 32 in this case, serve merely to cushion violent rebound or reaction as the parts assume their normal position.

It is to be understood that the invention is not limited to the exact details hereinbefore described, but that various modifications may be made such as come within the scope of appended claims.

We claim:

1. In a motor vehicle steering mechanism or the like, a steering column having an oscillatory shaft, a pitman arm comprising one section fixed on the shaft for swinging movement therewith, and a second section pivotally carried by the first, steering linkage connected with said second section, and cushioning devices interposed between said sections on opposite sides of the pivotal axis, each of which includes a spring, a fixed seat and a movable seat for the opposite ends of the spring, both carried by one of the sections, with the movable seat being adapted for abutment with the other section, whereby it is moved relative to the fixed seat with relative movement of said sections, and means to limit the movement of the movable seat to an extent lesser than the extent of relative movement of the sections.

2. In a motor vehicle steering mechanism or the like, a steering column having an oscillatory shaft, a pitman arm comprising one section fixed on the shaft for swinging movement therewith, and a second section pivotally carried by the first, steering linkage connected with said second section, and cushioning devices interposed between said sections on opposite sides of the pivotal axis, each of which includes a spring, a seat for one end of the spring on one of said sections, a part affording a seat for the opposite end of the spring, having limited movement relative to said section and being adapted for abutment with the other section, thruout its range of relative movement, whereby said cushioning devices are active thruout only a portion of the relative movement of said sections.

3. In a motor vehicle steering mechanism or the like, a steering column having an oscillatory shaft, a pitman arm comprising a section fixed on the shaft for swinging movement therewith, and a second section pivotally carried by the first section for independent swinging movement, steering linkage connected with said second section, resilient elements interposed between the sections on opposite sides of the pivotal axis, one of said elements being adapted to yieldingly resist relative swinging movement of the sections in one direction from an intermediate neutral position and the other being adapted to yieldingly resist relative movement in the opposite direction beyond the intermediate neutral position, and means associated with each element to prevent the expanding force thereof acting on the sections when the relative movement is in the direction opposite to that which it is adapted to yieldingly resist.

4. In a motor vehicle steering mechanism or the like, motion transmitting means comprising two relatively movable parts, one of which is movable to and fro and the other of which is acted on by such movement, resilient elements interposed between said parts, and adapted to transmit motion from one to the other, one of said elements being active upon movement in one direction and another being active upon movement in the other direction, each of said elements comprising a comparatively heavy spring that is held under some compression between the parts when the parts are in normal relative position, and is further compressed between the parts to yieldingly resist their relative movement in one direction, means to limit the extent of expansion of the spring upon relative movement in the other direction, and a pair of relatively light springs arranged to exert their forces in opposition to each other and adapted to follow up the movement of said parts in either direction and to absorb the reactionary forces of the heavy springs.

5. In a motor vehicle steering mechanism or the like, a motion transmitting device comprising two parts pivoted together for relative swinging movement in either of two directions from an intermediate neutral position, a cushion for yieldingly resisting relative movement of the parts in one direction from the neutral position, and a second cushion for yieldingly resisting relative movement of the parts in the opposite direction from the neutral position, each of said cushions including an elastic element that is placed under strain by the relative movement which it cushions, and is held by said parts under a certain strain when the parts are in the neutral position, whereby the tendency of the two elastic elements to recover tends to maintain the parts in their neutral position, means associated with each elastic element to limit its recovery as the parts are moved in the direction opposite that which it cushions, and a pair of auxiliary elastic elements of lesser value than the before mentioned main elastic elements interposed between said parts and arranged to exert their forces in opposition to each other to cushion the return of the parts under the influence of one or the other of the main elements.

6. In combination with the rock shaft and the drag link of steering apparatus, of an articulated pitman arm connected at its opposite ends to the rock shaft and drag link respectively for transmitting motion therebetween and comprising sections pivotally joined together intermediate their connections with the rock shaft and drag link for relative swinging movement about the axis of said intermediate joint, resilient elements interposed between the sections on opposite sides of the pivotal axis to cushion relative movement of the sections in both directions, each of said resilient elements including a spring that is held under compression between the sections when the sections are in normal position relative to each other, and means to limit expansion of the spring beyond a predetermined degree when the sections are moved in a direction to relieve the compression of the spring between them.

7. In combination with the rock shaft and the drag link of steering apparatus, of an articulated pitman arm connected at its opposite ends to the rock shaft and drag link respectively for transmitting motion therebetween and comprising sections pivotally joined together intermediate their connections with the rock shaft and drag link for relative swinging movement about the axis of said intermediate joint, each section having portions on opposite sides, extending transversely of the pivotal axis, spring elements interposed between said portions to cushion relative movement thereof towards each other and means associated with each spring to limit its expansion upon relative movement of said portions away from each other.

8. In combination with the rock shaft and the drag link of steering apparatus, of an articulated pitman arm connected at its opposite ends to the rock shaft and drag link respectively for transmitting motion therebetween and comprising sections pivotally joined together intermediate their connections with the rock shaft and drag link for relative swinging movement about the axis of said intermediate joint, cushioning elements interposed between adjacent portions of the sections on either side of the pivotal axis, and adapted to yieldingly resist movement of said portions toward each other upon relative swinging of the sections and means to limit the degree of recovery of said cushioning elements upon movement of said portions from one another.

9. In a motor vehicle steering mechanism or the like, an actuating shaft, steering linkage and means connecting the shaft and linkage and adapted primarily for transmitting motion from one to the other and secondarily for cushioning shocks and sharp reactions, said means including two members pivotally connected together at adjacent ends and connected at remote ends one to the shaft and the other to the linkage, a resilient element interposed between said members to yieldingly resist relative movement of the members toward each other, another resilient element interposed between said members to cushion reaction of the first mentioned resilient element, and means for limiting the degree of recovery of the first mentioned resilient element upon relative movement of the members away from each other.

10. In a motor vehicle steering mechanism or the like, an operating shaft, a drag bar, motion transmitting means between the shaft and bar, consisting of two members operatively connected for limited relative movement, a pair of spring elements held under compression between the members, one of which is adapted to be placed under additional compression by the relative movement of the members in one direction and the other of which is adapted to be placed under additional compression by the relative movement of the members in the opposite direction, whereby yielding resistance is offered by said springs to movement in either direction, means associated with each spring to limit the degree of recovery thereof after a certain predetermined relative movement, and follow up springs interposed between said members and arranged to exert their forces thereon in opposition to each other throughout the movement of the members and adapted to absorb the reactionary forces of the first mentioned spring elements.

In testimony whereof we affix our signatures.

WALTER A. KULL.
HARRY M. DENYES.